W. LLOYD.
TRAVELING GRATE.
APPLICATION FILED JAN. 25, 1918.
1,385,876.
Patented July 26, 1921.
6 SHEETS—SHEET 2.
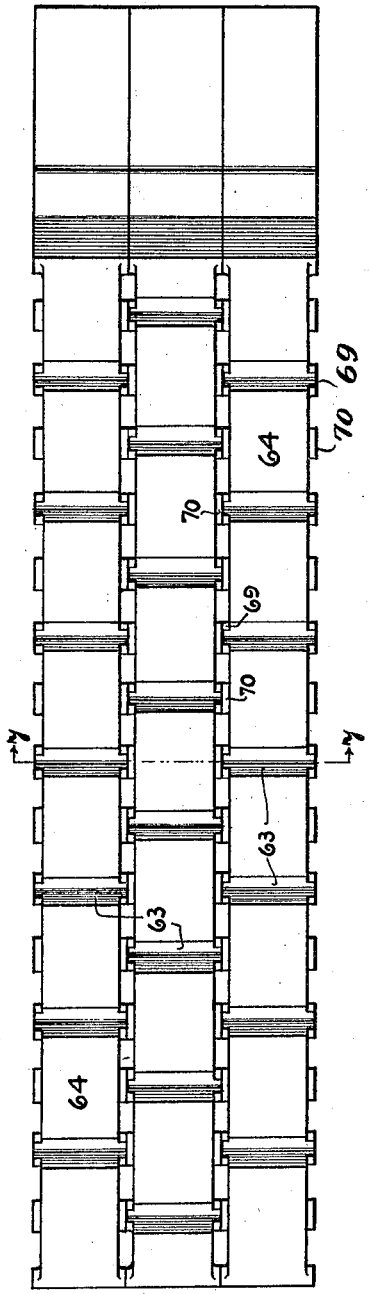
FIG.5.
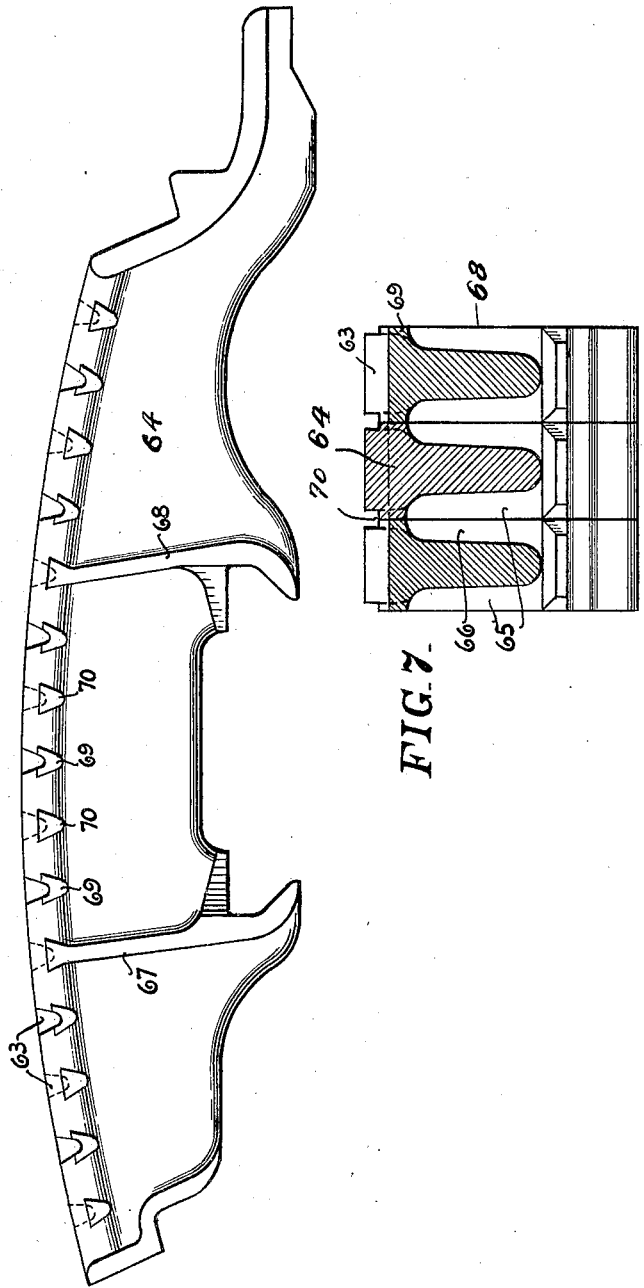
FIG.6.
FIG.7.
Inventor
WILLIAM LLOYD
BY Howson and Howson
his Attorneys

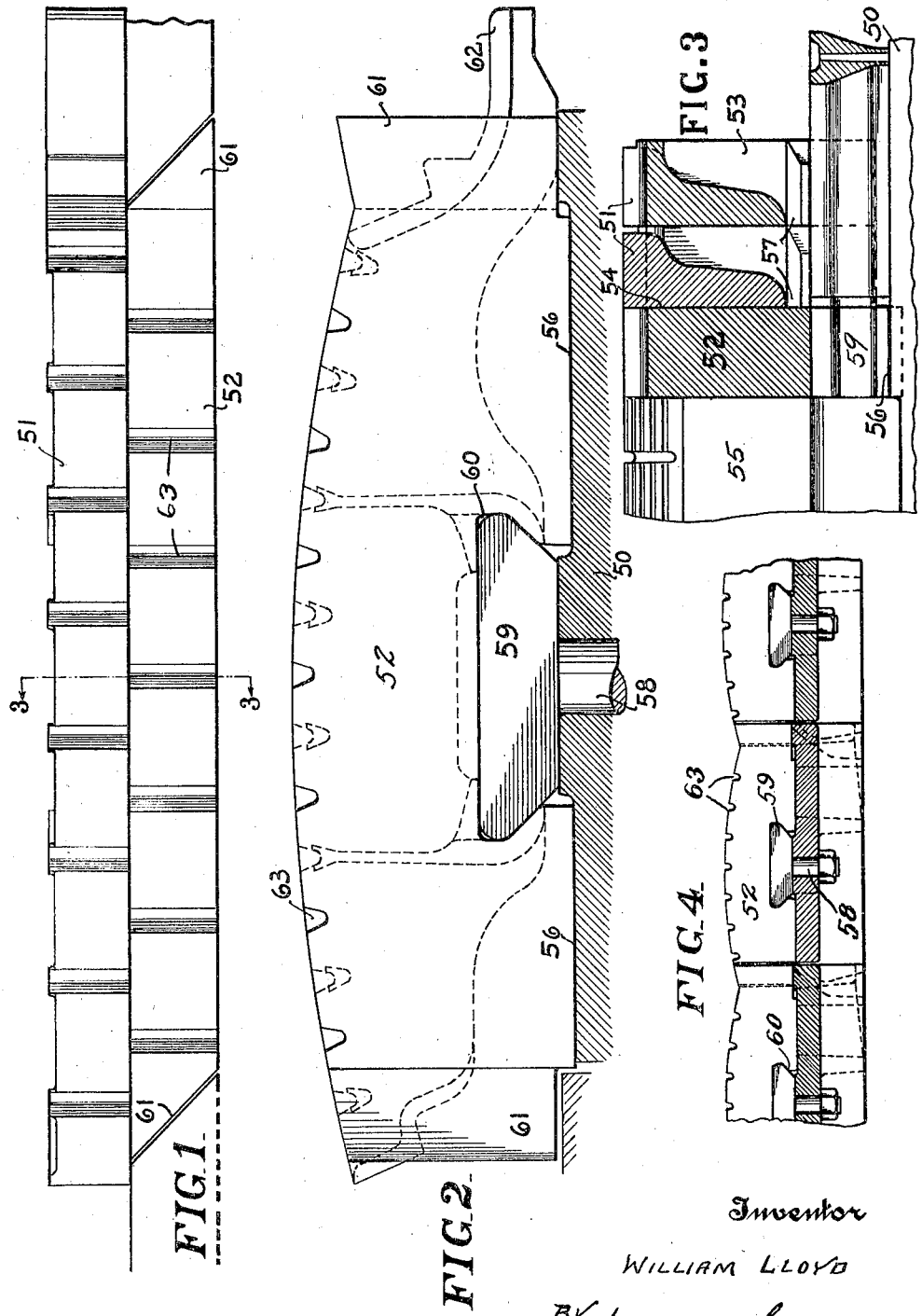

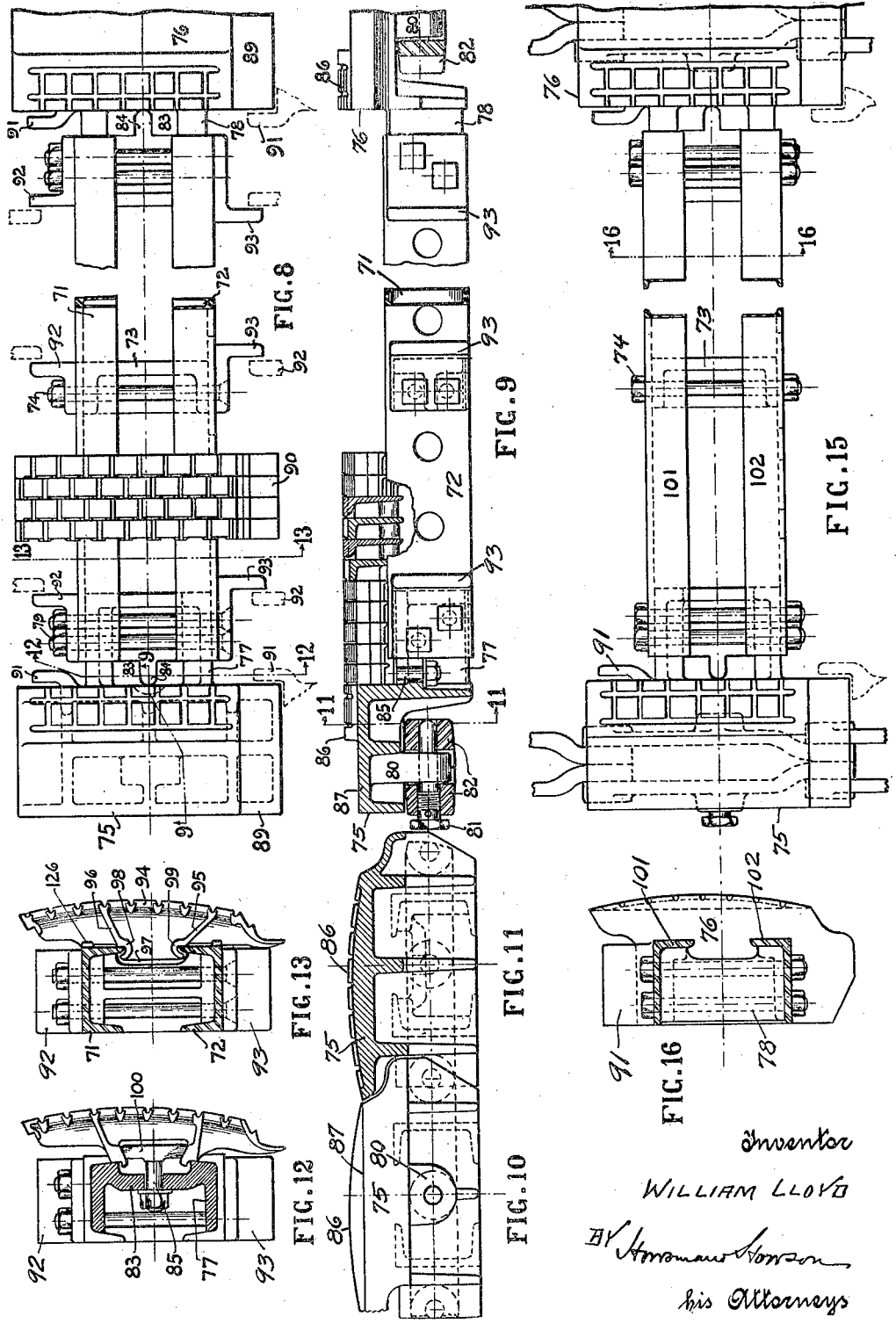

W. LLOYD.
TRAVELING GRATE.
APPLICATION FILED JAN. 25, 1918.
1,385,876.
Patented July 26, 1921.
6 SHEETS—SHEET 4.
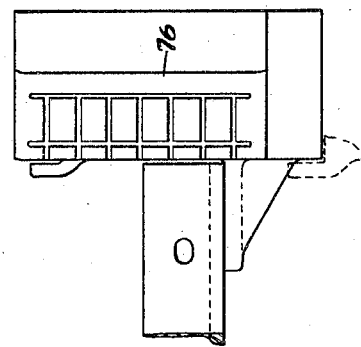
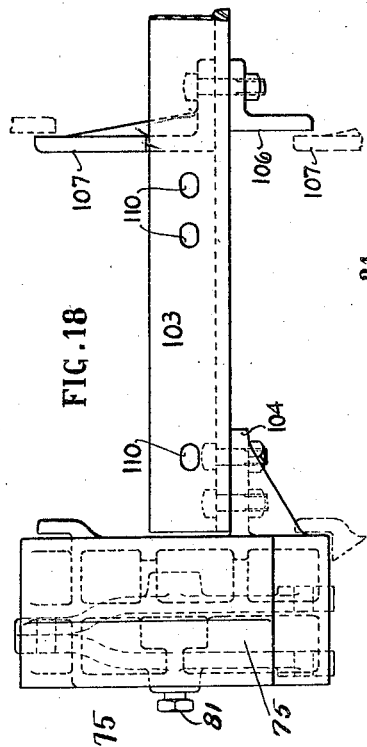
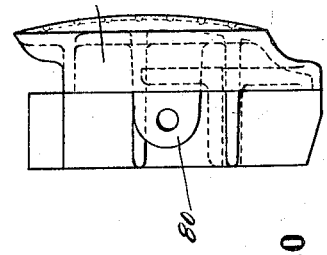
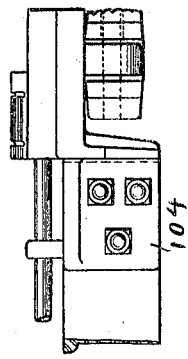
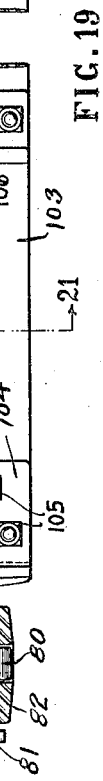
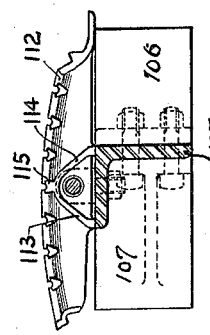
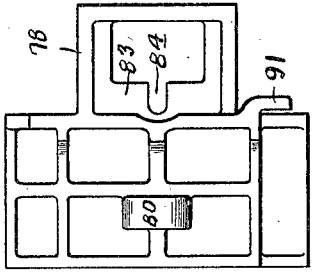
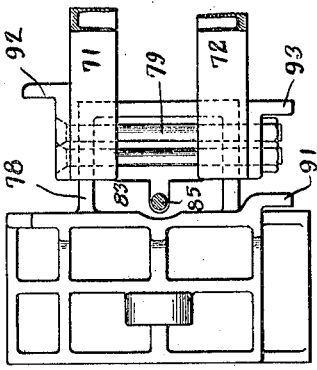
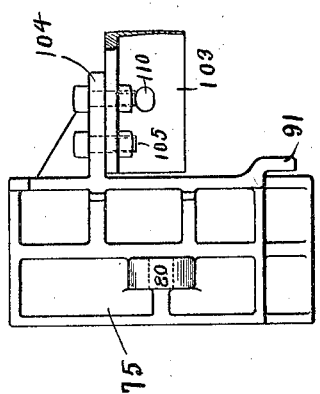
INVENTOR
WILLIAM LLOYD
BY
*his* ATTORNEYS

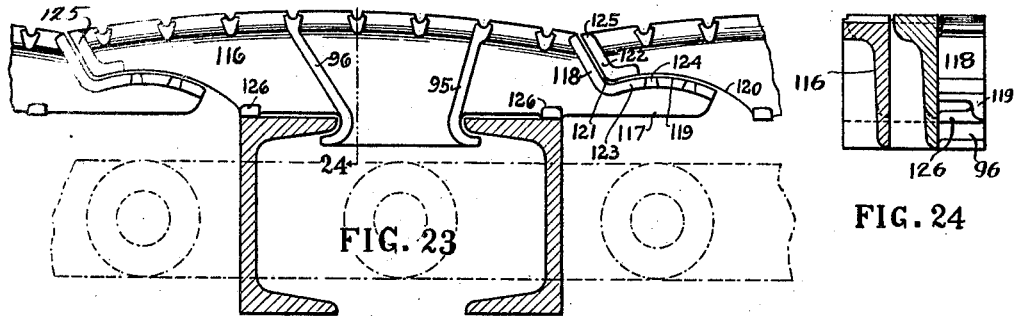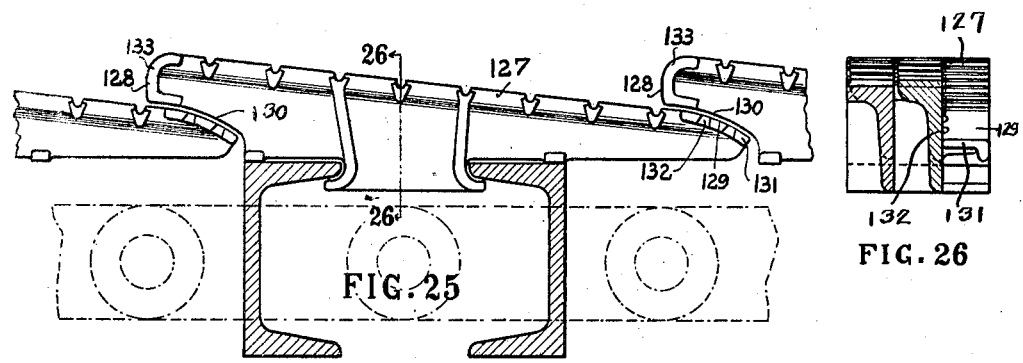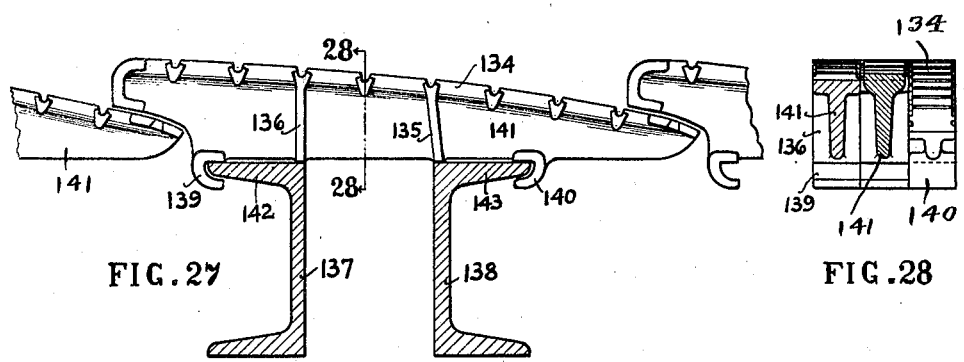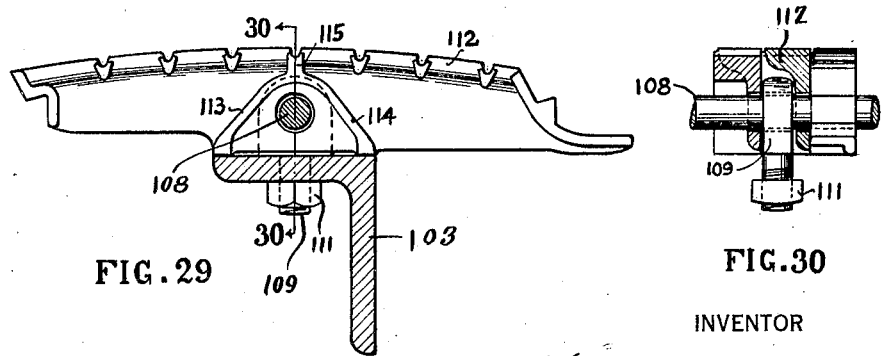

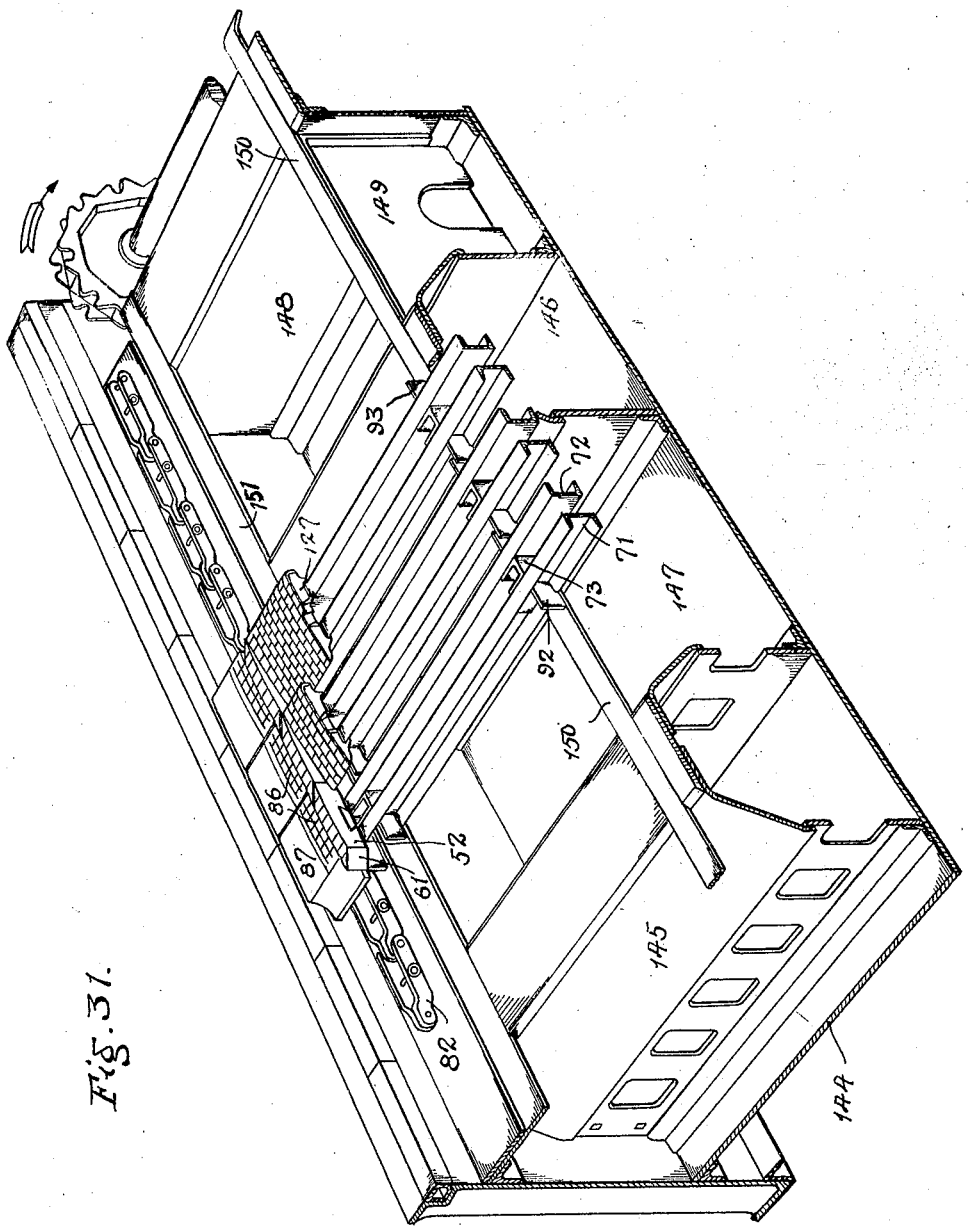

UNITED STATES PATENT OFFICE.

WILLIAM LLOYD, OF HAZLETON, PENNSYLVANIA, ASSIGNOR TO COXE TRAVELING GRATE COMPANY, OF PORT CARBON, PENNSYLVANIA, A CORPORATION OF PENNSYLVANIA.

TRAVELING GRATE.

1,385,876.            Specification of Letters Patent.     Patented July 26, 1921.

Application filed January 25, 1918. Serial No. 213,784.

*To all whom it may concern:*

Be it known that I, WILLIAM LLOYD, a citizen of the United States of America, residing at Hazleton, in the county of Luzerne and State of Pennsylvania, have invented certain new and useful Improvements in Traveling Grates, of which the following is a specification.

My invention relates to traveling grates and particularly to improvements in grates of the chain type shown in my Patents 1,340,725 and 1,330,041, the object of my invention being to improve the latter in the features hereinafter described and shown in the accompanying drawings in which—

Figure 1 is a plan view of a novel sealing key for the end of a grate bar key bank and a juxtaposed key of common type;

Fig. 2 is a side elevation thereof;

Fig. 3 is a sectional view on line 3—3, Fig. 1, showing also portion of the grate bar;

Fig. 4 is a fragmentary longitudinal section through the grate showing the end keys in side elevation;

Fig. 5 is a plan view of grate bar keys of modified construction, having air channels on both sides of a centrally located web;

Fig. 6 is a side elevation thereof;

Fig. 7 is a sectional view on line 7—7, Fig. 5;

Fig. 8 is a broken plan view of a grate bar in which the body of the bar comprises rolled stock of the channel type;

Fig. 9 is a broken front elevation thereof, with one end shown in section on line 9—9, Fig. 8;

Fig. 10 is an end elevation of the grate bar;

Fig. 11 is a sectional view of the grate bar on line 11—11, Fig. 9;

Fig. 12 is a sectional view on line 12—12, Fig. 8, showing the method of holding the end key;

Fig. 13 is a sectional view on line 13—13, Fig. 8, showing a spreader and sealing ribs;

Fig. 14 is an inverted plan view of the end block and associated parts lying to the left of the section line 13—13, Fig. 8;

Fig. 15 is a plan view of a grate bar, the body of which comprises a pair of rolled stock angle bars, but omitting longitudinal sealing ribs, keys and associate parts;

Fig. 16 is a sectional view thereof on line 16—16, Fig. 15;

Fig. 17 is an inverted plan view of the left hand grate bar end block shown in Fig. 15;

Fig. 18 is a plan view of a grate bar the body of which comprises a single rolled stock angle bar, omitting the air channels from the block at the left hand end of bar;

Fig. 19 is a front elevation thereof with some keys shown in section and one of the longitudinal sealing ribs;

Fig. 20 is an end view of above;

Fig. 21 is a sectional view on line 21—21, Fig. 19, showing manner of supporting the keys;

Fig. 22 is an inverted plan view of the end block shown in Fig. 19;

Fig. 23 is a side elevation of a key of modified construction with portions of adjoining keys;

Fig. 24 is a front elevation of one of said keys and section on line 24—24, Fig. 23, of two other keys;

Fig. 25 is a side elevation of a key of another modified construction, with portions of adjoining keys;

Fig. 26 is a front view of one of said keys and section on line 26—26, Fig. 25, of two other keys;

Fig. 27 is a side elevation of a key further modified in construction and portions of adjoining keys;

Fig. 28 is a front view of one of said keys and section on line 28—28, Fig. 27, of two other keys;

Fig. 29 is a side elevation of a key further modified in construction;

Fig. 30 is a front view of one of said keys and section on line 30—30, Fig. 29, of two other keys;

Fig. 31 is a broken perspective of portion of a wind chest and grate.

One of the difficulties incident to the operation of a traveling grate of the present type resides in the tendency of the blast to escape beyond the ends of the grate bars and to blow up too strongly through the marginal area of the fuel bed adjacent the side walls of the furnace chamber. The fuel at this point is in any event more or less disturbed by its drag against the walls of the fire box, incident to the advance of the grate. This has the effect of loosening the fine particles of fuel and rendering the fuel bed more porous at this point, so that the blast finds a more ready passage therethrough than it does through the more quiescent body of the fuel bed at the intermediate portion of the grate. It is therefore necessary to provide some means for preventing this lateral escape of the blast at the side margins of the grate. As indicated in the constructions shown in my patents above referred to, I have provided sealing plates at the sides of the wind box which coöperate with downwardly projecting ribs on the grate bars. There is, nevertheless, a considerable leakage of the blast between the ends of the key banks and the end blocks of the grate bars; and while the construction shown in said applications is an improvement upon previous constructions in the respect mentioned, I have further improved the lateral seals in my present construction by providing a sealing key at each end of each grate bar, as shown in Figs. 1 to 4 hereof.

Referring to these figures in which I have shown the construction at one end of the grate bar 50, the latter carries as usual a bank of keys 51 of any suitable type, terminating, however, at each end of the grate bar in a sealing key 52 of novel construction. As will be noted from Fig. 3, the body of this key 52 is free from lateral recesses such as 53 which are provided for the keys of the main bank to permit the upward flow of the blast therethrough. Consequently, when it is placed adjacent a key of the type here shown, in which one side lies in a vertical plane, as at 54, there is no channel for the upward flow of the blast between this sealing key and the adjacent member of the key bank. Similarly, the juxtaposed wall of the end block 55 of the grate bar 50 having a plane face, there is no passage afforded at this point between the sealing key and the end block for the upward escape of the blast. The web of the grate bar 50 being free from apertures adjacent the end block and the lower surface of the sealing key being shaped to form a joint therewith, the escape of the blast at this point 56 is also prevented. Furthermore, whereas the keys 51 of the main bank are provided with channels 57 above the dovetail rib on the grate bar to permit the flow of air therethrough to opposite faces of the key, the sealing key fits the rib snugly and minimizes leakage at this point also.

In Figs. 1 to 4 I have shown the end of the bar at which the dovetail is cut away to permit the adjustment of the keys thereon, and at this end of the bar the sealing key is secured by means of the bolt 58 having a head 59 of dovetail contour which forms an air-sealing rib at this point and is closely engaged in the corresponding recess 60 in the lower edge of the sealing key. To form a continuous seal between adjacent banks of keys, the ends of the sealing key are beveled at 61, as indicated, and thus form a lap-joint with the sealing keys of the adjacent banks. The beveled wings 61 follow the contour of the fuel supporting areas of the keys rather than the ash supporting apron 62 of the main key bed. While this leaves a small hiatus in the apron, the ash falling between the key banks at the end of the working travel of the grate is not objectionable. Moreover, the flanges 61 could be designed to provide an ash catching apron similar to that of the regular key bank if it were necessary. Inasmuch as the fuel bed extends over the sealing key 52, the latter is serrated at 63 on its upper face to permit the air which unavoidably filters up between the end block 55, on one side, and the adjacent key 51, on the opposite side of the sealing key, to permeate the fuel.

In Figs. 5, 6 and 7 I have shown an improved type of key for the main bank, carried by the grate bar. In the keys shown in the patents above referred to, the air channel between adjacent keys is formed by recessing each key from one side only and spacing this side from the adjacent key by means of studs, or studs and ribs, or ribs, alone, from the plane side of the juxtaposed key of the bank. In the improved construction here shown, I have provided a key 64, the web of which beneath the fuel supporting top is recessed on both sides at 65 and 66 to afford a channel of considerably greater area leading toward the fuel bed and thus affording freer flow of air to the fuel than in the construction heretofore employed. In addition to the ribs 67 and 68, which not only strengthen the web, but form guide channels for the air blast and spacing means between the keys, I provide a series of studs 69 and 70 which have the double function of affording additional spacing means between the keys and also of acting as spreaders for the air blast. The studs 69 are slightly below the fuel supporting surface of the key and are placed in register with the cross grooves 63 therein and are themselves channeled to conform to the channel of the cross grooves. The studs 70 are interposed between the studs 69 and are blank. Inasmuch as the cross grooves 63 in adjacent keys are staggered with relation to each other, it follows that the blank studs 70 of one key are opposed to the channel studs 69 of the adjacent key and block the end grooves thereof. The blast rising between adjacent keys is thus spread by the studs 69 and 70 and forced to pass upward through the slots between adjacent studs rather than permitted to follow its easier course into the cross channels 63, which it would otherwise do. A more even distribution of the blast throughout the fuel bed is effected, and this is advantageous on a grate burning very fine fuel of the type for which the present grate is especially designed.

The grate bars of stokers of the present type have heretofore been made from castings. Incidentally, these bars have been somewhat heavier than really necessary and have required more or less finishing before they are ready for use. In Figs. 8 to 11 inclusive, I have shown a lighter construction in which the body of the grate bar is made from structural shapes of standard type produced in the rolling mills, and the cast metal element of the bar is confined to the terminal or end blocks thereof. Thus, as shown in Fig. 8, the body of the bar comprises a pair of channel irons 71 and 72 having their flanges opposed and spaced apart by distance pieces 73 to which they are united by bolts 74. The terminal or end blocks comprise castings 75 and 76 having inwardly extending projections 77 and 78 which extend into the area of the channel irons 71 and 72 and are held by the bolts 79 passing therethrough. The end blocks are provided with downwardly extending chain lugs 80 pierced by the bolt 81 which serves to unite the grate bar to the links 82 of the carrying chain. A web 83 projecting from the inner face of the end block and extending between the projections 77 or 78 thereof, is slotted at 84 to receive the bolt 85 which carries the end member of the key bank. The portion 86 of the block is raised to conform to the contour of the key bank while the adjacent flat portion 87 forms a bearing surface upon which the grate is supported during the return travel of the grate. At the following end of the block an apron 89 is formed which lies in register with the ash aprons 90 of the key bank. In order to form an end seal between the blocks of adjacent bars, a flange 91 is offset from the forward end of the block which laterally overlaps the apron 89 of the adjacent end block and minimizes the air leakage at this point. The sealing ribs to coöperate with the sealing plates of the wind chest are formed by the lower edges of the distance pieces 73 combined with brackets 92 and 93 bolted on the outer faces of the channel irons 71 and 72 and held in position by the distance piece bolt 74. The overlap between the ribs of adjacent bars is secured by making the base of the bracket 93 of slightly greater length transversely of the grate than the base of the bracket 92. The keys for use with a bar of this type may be shaped as indicated in Fig. 13. Here, the key 94 is shown with lateral channeling ribs 95 and 96 which are extended downward below the base of the key and flared outward to form grooves 98 and 99 which take over the edges of the upper flanges of the channels 71 and 72. The end key carried by the bolt 85 has a dovetailed recess into which fits the correspondingly shaped head 100 of the bolt.

In Figs. 15 and 16 I have shown a substantially similar construction with the exception that the body of the bar comprises rolled angle-irons 101 and 102 instead of channel irons. In other respects the construction is substantially identical with that just described.

In Figs. 18 to 21 a single angle-iron 103 is used for the body of the grate bar and the end blocks are slightly modified to coöperate therewith, each being provided with a bracket 104, the web of which lies against the vertical web of the angle-iron and is secured thereto by triangularly arranged bolts 105. The sealing ribs for this construction comprise brackets 106 and 107 offset from each other so as to afford an overlap between the ribs of adjacent bars. The keys are supported upon the upper flange of the angle-iron by a sectional rod 108, each section passing through eye-bolts 109, the shanks of which pass down through holes 110 in the angle-iron and are secured beneath the latter by nuts 111. The keys 112 are of special form having their webs pierced to receive the rod 108, while the lateral ribs 113 and 114 form at their lower ends feet resting upon the opposite margins of the top flange of the angle-iron and converging at their upper ends to a common point, thus permitting the air blast to have access to all portions of the fuel supporting surface of the key. If desired, the ribs 113—114 may merge at their upper ends into a lug 115 corresponding in shape and function to one of the lugs 69 or 70 of the construction shown in Figs. 5 and 6. The ribs thus form a protecting arch over the rod 108 which prevents any ash which may fall through the openings between the keys from depositing upon the bar itself and thus keeps the latter clean and prevents displacement of the keys thereon owing to the interposition of foreign matter between the supporting feet of the key and the bar top. This general construction is extremely economical and has the particular advantage of permitting sections of the keys to be removed for repair or replacement of damaged keys without the necessity of taking off substantially all of the keys from the bank in order to obtain access to a particular damaged area.

In Figs. 23 and 24 the key 116 is shown of the general type illustrated in Fig. 13, but slightly modified thereover in the following end or ash apron 117. This end of the key comprises a downwardly angled portion 118 lying beyond the fuel supporting area and merging into an end section 119, the curvature of the upper surface of which corresponds with approximate exactness to the circumference of a circle having as its axis the chain link connecting pin. This pin is the fulcrum point of the chain link proper when the bar reaches the end sprocket, and the grate bar swings thereon as it rounds the sprocket. The forward end of the key has a curved area 120 corresponding to that of the end section 119 so that the adjacent keys may be made to interfit snugly, thus preventing excess air from passing up between the key banks. Moreover, the angle 121 between the curved sections and the abutting ends 118 and 122 forms a baffle further impeding the passage of air at this point and affording a trap for ash or fine coal dust which may find its way between the keys at this point. The lateral flange 123 is notched at 124 to permit the upward passage of air therethrough, but the perforations are not of such size as to interfere with the function of the apron as an ash support when the keys part at the end of the working travel of the grate. The flange 125 at the forward end of the key is relatively short and extends only a slight distance beyond the angle 121 and does not reach the notched area of the flange 123. It will be noted that in this key, as well as in the key shown in Fig. 13, bosses 126 are provided at the lower portion of the web of the key to rest upon the outer margin of the grate bar and form steadying feet for the key.

In Figs. 25 and 26 a key of further modified construction is illustrated in which the fuel supporting surface 127 has an upward inclination from its rear to its front end and the latter rises over the rear end of the adjacent key. This feature is of value in assisting the feed of the fuel from the hopper, since the surface of the grate thus presents not only serrated surface for the keys themselves, but serrated banks of keys and the forward ends 128 afford positive pushing members which grip the fuel and feed it forward as the grate advances beneath the hopper. In this construction I have embodied the feature referred to in connection with the preceding type of key, viz., the curvature of the apron 129 on the circumference of a circle struck from the axis of the chain link connecting pin. The forward end of the key is similarly curved at 130. The flange 131 of the apron is also notched at 132 to permit the blast to rise directly to the fuel resting on the superposed forward portion of the adjacent key. The blast is confined to this area by the flange 133 at the forward end of the key.

In the key shown in Figs. 27 and 28 the upper surface 134 thereof is given a slight curvature. The ribs 135 and 136 are substantially straight and rest upon the upper edge of the webs of the channel irons 137 and 138 which are here arranged with their webs opposed and their flanges projecting outwardly. Foot pieces 139 and 140 formed on the web 141 of the key form channels which engage the outer margins of the upper flanges 142—143 of the channel irons.

Figs. 29 and 30 show in enlarged detail the key construction illustrated in Figs. 19 and 21.

In Fig. 31 I have indicated the general organization of the grate and wind seals. The wind box 144 has transverse twyer boxes 145 and 146 and interposed chambers 147 and 148 to which the twyers open. Chamber 148 is longitudinally divided by partition 149 at the top of which is sealing plate 150. One of the side sealing plates 151 is also shown. As will be noted the sealing flanges 92—93 and interposed fillers 73 travel on the plate 150 and effectively complete the subdivision of the blast. I have also indicated the structural metal grate bar channels 71—72, and the type of key shown in greater detail in Figs. 27—28, as well as the end sealing key 52 and cast metal end block by which the grate bar is supported on chain 82. For the details of construction however, reference is made to the preceding figures drawn to a larger scale.

While I have illustrated certain features of construction in keys having side webs and others having center webs (see Figs. 24–30), it is to be understood that many of the features of construction are available in either type of key, and I do not limit the invention illustrated with one type of web to that particular type, inasmuch as these features are generally interchangeable.

It will be understood that the constructions illustrated may be variously combined and that the various novel features may be used independently or all in a single construction, or applied to conventional bars and keys as may be desired, without departing from my invention. Nor are the features of improvement limited to the particular type of key and bar shown. In the following claims the word key is used in a sense broad enough to cover grate top plates or integral grate top bars, where appropriate, and similarly, the term grate bar is, where appropriate, used in a sense broad enough to cover a plurality of members supporting a fuel carrying member. Various modifications and variations in detail will readily occur to those skilled in the art without departing from what I claim as my invention.

I claim:—

1. In a traveling grate, a grate bar having an end block, a bank of keys and an air seal key interposed between said end block and key bank.

2. In a traveling grate, a grate bar having an end block, a key-carrying mid-portion, an air sealing rib thereon adjacent the block, and an air sealing key adjacent the end block coöperating to prevent the lateral escape of the air blast to the end of the grate bar.

3. In a traveling grate, a grate bar having an end block and a key-carrying mid-portion, in combination with an air seal key adjacent the end block, the support for said key being imperforate and coöperating with said key to prevent lateral escape of the air blast to the end of the grate bar.

4. In a traveling grate, a grate bar, a bank of keys spaced apart thereon to permit the upward flow of air to the superposed fuel bed, in combination with an air seal key juxtaposed without intervening air space at the end of the key bank and serving to prevent the lateral escape of air to the end of the grate bar.

5. In a traveling grate, a grate bar, a bank of keys thereon and a key at the end of said bank having a sealing flange projecting into the area of an adjacent bank of keys and having a fuel supporting surface conforming to the contour of the keys in said bank.

6. In a traveling grate, a key bank comprising a plurality of members and having as a member thereof an imperforate key with plane sides juxtaposed to members having like plane sides to minimize the upward flow of air in the area of said key.

7. In a traveling grate, a grate bar and a key bank supported thereon and comprising a key having a fuel supporting surface corresponding to the contour of the keys of said bank and an end flange projecting into the area of the adjacent bank, said flange having a fuel supporting surface corresponding to that of the keys of said adjacent bank.

8. In a traveling grate, a grate bar having a bank of keys comprising as an element thereof a key having a fuel supporting flange shaped to overlap a fuel supporting flange at the coöperating end of a key on an adjacent key bank.

9. In a traveling grate, a grate bar having a bank of keys comprising as an element thereof a key having at each end a fuel supporting flange overlapping a similar flange at the end of a coöperating key in the adjacent key bank.

10. In a traveling grate, a grate bar and a key bank supported thereon comprising as an element thereof a key having transverse channels in its fuel supporting surface, a web underlying the latter and recessed on opposite sides of the key to afford air passages, together with lateral studs alined with the channels in the fuel surface of the key and projecting into said air passages to prevent the direct flow of air into said channels.

11. In a traveling grate, a grate bar and a key bank supported thereon comprising adjacent keys having transverse channels in their fuel supporting surfaces, the channels on one key being staggered with relation to the channels on the other key, channeled studs on the adjacent sides of the keys for spacing the same apart to afford an air passage between the keys, said studs being alined with the channels in the fuel supporting surfaces of the keys, together with coöperating studs opposed to said channeled studs to prevent the direct flow of air into said channels.

12. In a traveling grate, a key bank and structural-shape bar means for carrying the same, said bar comprising independent cast metal terminal blocks secured to opposite ends thereof and intermediate independent sealing ribs secured to said bar and extending in the direction of the travel of the grate.

13. In a traveling grate, a key bank and structural-shape bar means for carrying the same, said bar comprising independent cast metal terminal blocks secured to opposite ends thereof and intermediate sealing ribs secured to said bar and extending in the direction of the travel of the grate, the opposite ends of said ribs being offset from each other to overlap the ribs of an adjacent bar and form a seal therewith.

14. In a traveling grate, a grate bar having a structural metal mid-section for carrying a key bank, together with brackets secured to said mid-section and forming sealing ribs extending in the direction of the travel of the grate.

15. In a traveling grate, a grate bar comprising a rolled metal mid-section and cast metal terminal blocks having projections extending into the area of said mid-section to afford means for securing said parts together, together with independent intermediate sealing ribs secured to said mid-section and extending in the direction of the travel of the grate.

16. In a traveling grate, a grate bar comprising a pair of parallel rolled metal mid-sections and distance pieces secured between said sections for spacing the latter apart, the lower edge of said distance pieces lying substantially in the plane of the lower edge of the mid-sections and forming a wind seal, together with a bracket secured to one of said mid-sections and forming a continuation of said wind seal.

17. In a traveling grate, a grate bar comprising a pair of parallel rolled metal mid-sections and distance pieces secured between said sections for spacing the latter apart, the lower edge of said distance pieces lying substantially in the plane of the lower edge of the mid-sections and forming a wind seal, together with a bracket secured to one of said mid-sections and forming a continuation of said wind seal, and a second bracket secured to the other mid-section and offset from said distance piece to form a continuation of said wind seal, but arranged to overlap the first-mentioned bracket on the adjacent grate bar.

18. In a traveling grate, a grate bar, a supporting chain to which said bar is pivoted, a key bank carried by said bar and comprising a key having at its following end an apron underlying the forward end of the corresponding key of the adjacent bank and having at least a portion of said underlying apron curved substantially on the arc of a circle the axis of which coincides substantially with the axis of the pivotal connection between the bar and its supporting chain.

19. In a traveling grate, a grate bar comprising a pair of spaced rolled metal bars having a key bank supported on said bars and comprising a key rectangular in plan with inwardly offset supporting web beneath the fuel bed face thereof, and having side ribs extending from the spaced elements of said bars to the top area of the key to form separate channels for the air rising through the grate to the fuel bed resting on said key bank.

20. In a traveling grate, a grate bar, a key bank thereon comprising a key having a general downward inclination from its forward end to its following end, the latter underlying the forward end of the corresponding key of the adjacent bank, for the purpose described.

21. In a traveling grate, series of consecutive overlapping key banks, the keys of each bank having a general downward inclination from their forward ends to their following ends which underlie the keys of the succeeding bank to afford a serrated fuel supporting surface adapted to positively engage and thus assist the feed of fuel to the grate from a hopper at the feed end of the grate.

In testimony whereof I have signed my name to this specification.

WILLIAM LLOYD.